(12) United States Patent
Bonny

(10) Patent No.: US 10,125,752 B1
(45) Date of Patent: Nov. 13, 2018

(54) HYDRAULIC MOTOR

(71) Applicant: Hydro-Gear Limited Partnership, Sullivan, IL (US)

(72) Inventor: Nathan W. Bonny, Shelbyville, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 1343 days.

(21) Appl. No.: 13/946,778

(22) Filed: Jul. 19, 2013

Related U.S. Application Data

(60) Provisional application No. 61/673,594, filed on Jul. 19, 2012.

(51) Int. Cl.
| | |
|---|---|
| *F04B 17/00* | (2006.01) |
| *F04B 49/03* | (2006.01) |
| *F04B 53/20* | (2006.01) |
| *F03C 1/40* | (2006.01) |
| *F01B 3/00* | (2006.01) |
| *F15B 21/04* | (2006.01) |

(52) U.S. Cl.
CPC ............ *F04B 17/00* (2013.01); *F01B 3/0032* (2013.01); *F03C 1/0686* (2013.01); *F03C 1/0697* (2013.01); *F04B 49/03* (2013.01); *F04B 53/20* (2013.01); *F15B 21/041* (2013.01); *F03C 1/0678* (2013.01)

(58) Field of Classification Search
CPC .. E03B 5/02; F04B 49/22; F04B 49/02; F04B 49/03; F04B 49/035; F04B 49/20; F04B 49/225; F04B 49/00; F04B 49/022; F04B 49/24; F04B 49/08; F04B 53/20; F04B 2203/12; F04B 2203/1201; F04B 2203/1202; F04B 2207/042; F04B 17/00; F16H 61/4052; F16H 61/4043; F16H 61/461; F16H 61/4041; F16H 61/478; F15B 2211/76; F15B 21/005; F15B 21/041; F01B 31/22; F01B 3/0055; F01B 3/0064; F01B 3/0091; F01B 3/0032; F03C 1/0686; F03C 1/0697; F03C 1/0678
See application file for complete search history.

(56) References Cited

U.S. PATENT DOCUMENTS

| | | | | |
|---|---|---|---|---|
| 2,733,665 | A | * | 2/1956 | Klopp ................... F01B 3/0032 464/117 |
| 2,777,287 | A | | 1/1957 | Tweedale |
| 2,792,814 | A | * | 5/1957 | Christophel ............ F01B 25/12 91/335 |

(Continued)

*Primary Examiner* — Peter J Bertheaud
(74) *Attorney, Agent, or Firm* — Neal, Gerber & Eisenberg LLP

(57) ABSTRACT

A hydraulic motor apparatus includes a motor housing engaged to an end cap having a first porting system and an adapter connected to an external surface of the end cap and having a second porting system. A filter may be attached to the adapter and connected to the second porting system and a pressure reducing valve in the adapter is connected to the second porting system. The assembly may also include a controller operatively connected to the pressure reducing valve and system sensors measuring parameters affected by the output of the hydraulic motor apparatus, whereby the pressure reducing valve is operatively controlled by the controller in response to input from the system sensors.

15 Claims, 7 Drawing Sheets

(56) References Cited

U.S. PATENT DOCUMENTS

| | | | | |
|---|---|---|---|---|
| 3,249,061 | A * | 5/1966 | Ricketts | F01B 3/0055 91/486 |
| 3,319,419 | A | 5/1967 | Hann | |
| 3,322,281 | A * | 5/1967 | Gulick | B01D 35/147 137/512 |
| 3,522,759 | A * | 8/1970 | Martin | F01B 3/0041 91/507 |
| 3,942,486 | A | 3/1976 | Kirchner | |
| 4,126,553 | A | 11/1978 | Berg | |
| 4,437,389 | A * | 3/1984 | Kline | F01B 3/0032 91/499 |
| 4,655,689 | A | 4/1987 | Westveer et al. | |
| 4,740,140 | A | 4/1988 | Benson | |
| 4,856,264 | A * | 8/1989 | Nishimura | A01D 34/6806 56/10.8 |
| 5,259,193 | A * | 11/1993 | Maesaka | F16H 39/02 60/453 |
| 5,477,675 | A * | 12/1995 | Ingraham | B63H 25/22 180/417 |
| 5,603,609 | A * | 2/1997 | Kadlicko | F04B 1/28 417/270 |
| 5,972,210 | A | 10/1999 | Munkel | |
| 6,142,110 | A | 11/2000 | Bartley et al. | |
| 6,189,411 | B1 | 2/2001 | Francis | |
| 6,196,109 | B1 * | 3/2001 | Zumbusch | F04B 1/2042 91/6.5 |
| 6,301,885 | B1 * | 10/2001 | Johnson | B60K 17/105 60/487 |
| 6,311,488 | B1 | 11/2001 | Maruta et al. | |
| 6,467,263 | B2 * | 10/2002 | Johnson | F16H 39/14 60/454 |
| 6,547,531 | B1 * | 4/2003 | Cumbo | F04B 1/295 417/222.1 |
| 7,547,203 | B2 | 6/2009 | Dieterich | |
| 7,886,534 | B2 * | 2/2011 | Dong | F16H 61/4165 60/487 |
| 2004/0164008 | A1 | 8/2004 | Smith | |
| 2004/0261407 | A1 * | 12/2004 | Du | F03C 1/0686 60/448 |
| 2008/0056887 | A1 * | 3/2008 | Iannizzaro | F04C 2/086 415/121.2 |
| 2010/0287926 | A1 * | 11/2010 | Ogasawara | F01P 5/04 60/487 |

* cited by examiner

HYDRAULIC MOTOR

CROSS-REFERENCE

This application claims the benefit of U.S. Provisional Patent Application No. 61/673,594 filed on Jul. 19, 2012, which is incorporated herein in its entirety.

BACKGROUND OF THE INVENTION

This application relates to hydraulic motors generally and, in particular, to hydraulic motors having an adjustable limit of mechanical torque.

SUMMARY OF THE INVENTION

An improved hydraulic motor apparatus having an end cap and an adapter attached thereto is disclosed herein, as described in more detail below. A filter and valve may be located in the adapter to improve flexibility and performance. The motor apparatus can be mounted on a vehicle or other powered machine or apparatus. Also disclosed herein is a method for installing a combined insert and bushing for the motor swash thrust bearing into a motor housing, where the bushing acts to retain the components of the thrust bearing in the insert.

A better understanding of the objects, advantages, features, properties and relationships of the invention will be obtained from the following detailed description and accompanying drawings which set forth illustrative embodiments that are indicative of the various ways in which the principles of the invention may be employed.

DETAILED DESCRIPTION OF THE DRAWINGS

Figure 1:
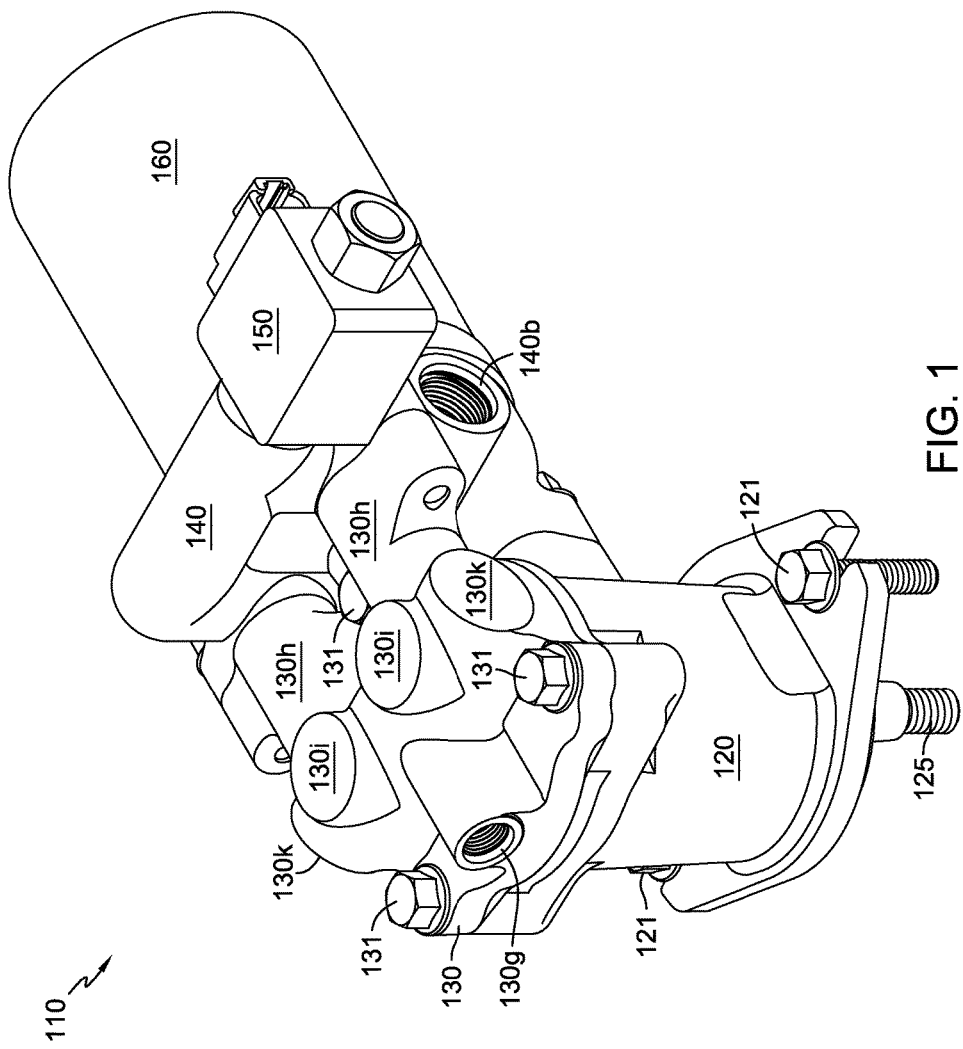
FIG. 1 is a perspective view of a hydraulic motor apparatus in accordance with an embodiment of the present invention.
Figure 2:
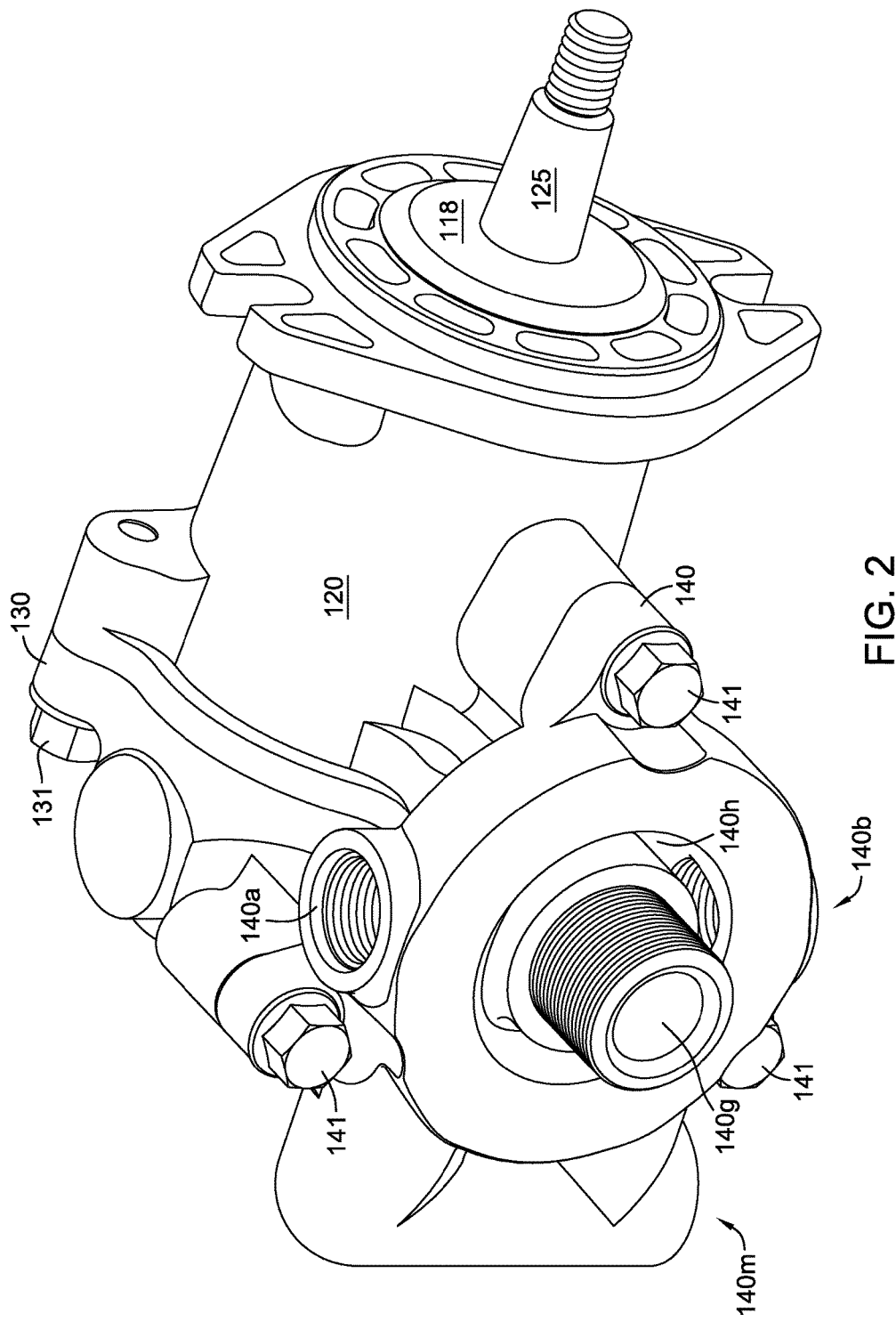
FIG. 2 is a perspective view of the motor apparatus of FIG. 1 with certain components removed for clarity.
Figure 3:
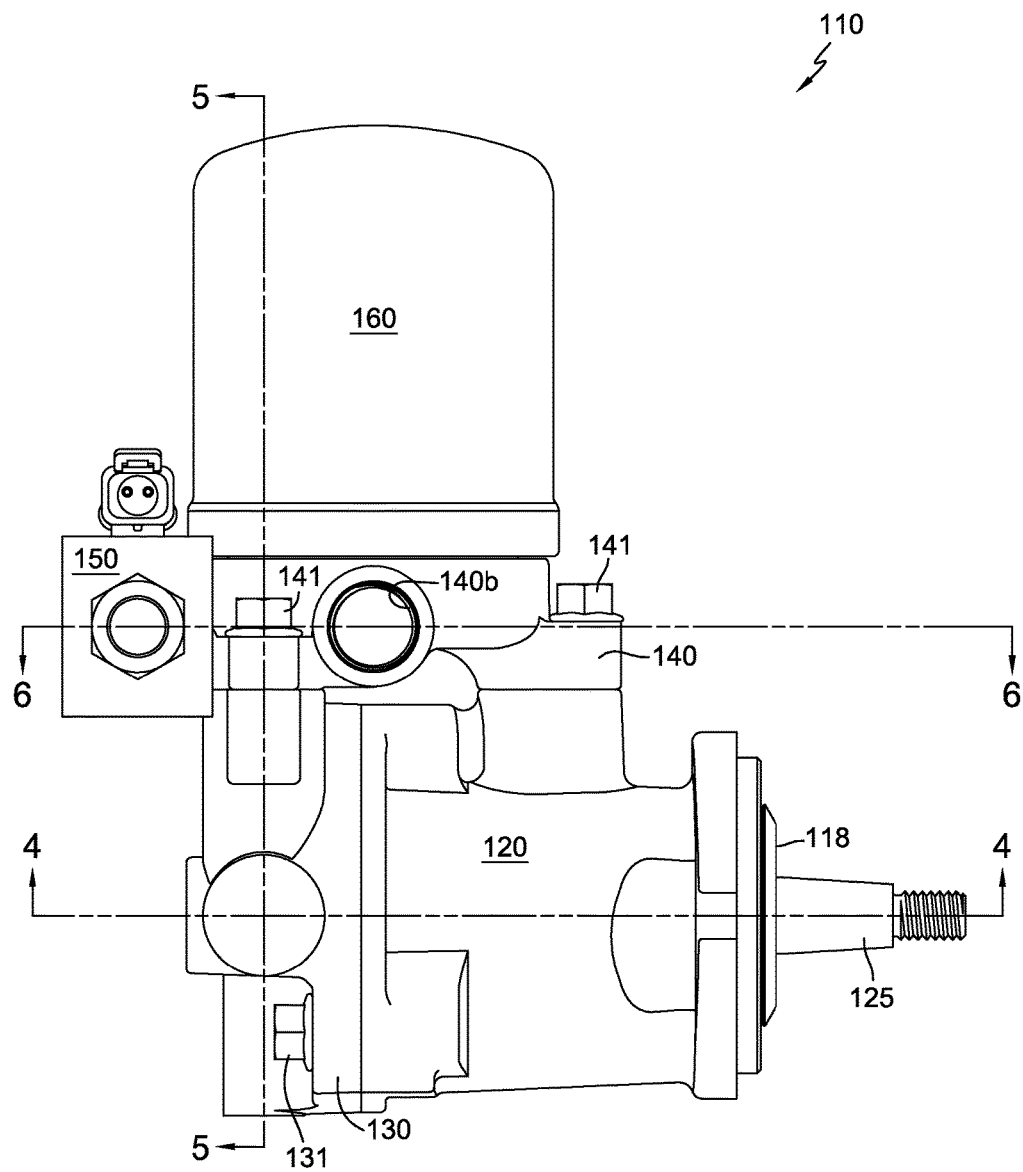
FIG. 3 is a plan view of the motor apparatus of FIG. 1.
Figure 4:
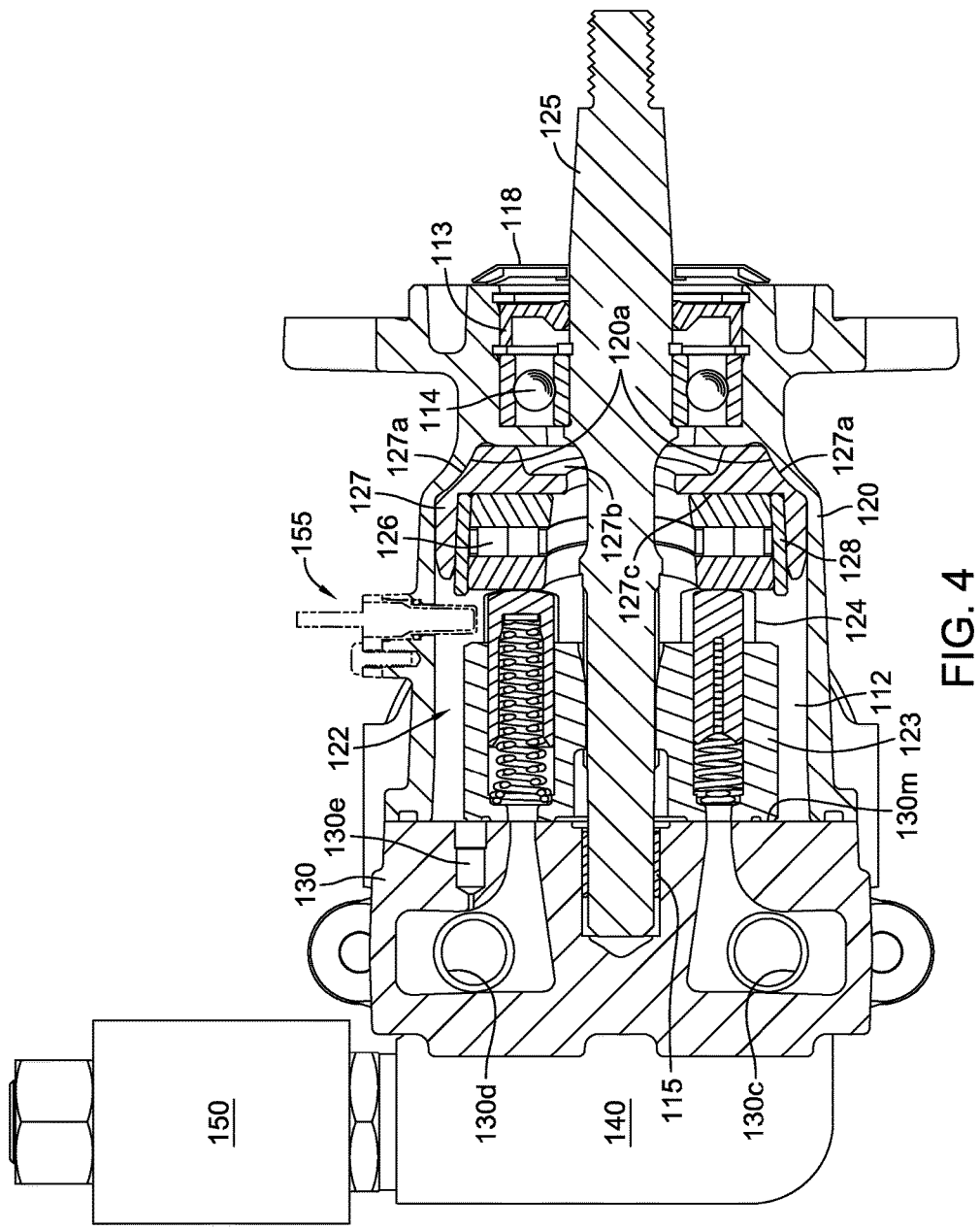
FIG. 4 is a cross-sectional view of the motor apparatus of FIG. 3 along line 4-4 in FIG. 3.

The description that follows describes, illustrates and exemplifies one or more embodiments of the present invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the present invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers or serial numbers in cases where such labeling facilitates a more clear description. Additionally, the drawings set forth herein are not necessarily drawn to scale, and in some instances proportions may have been exaggerated to more clearly depict certain features. As stated above, the present specification is intended to be taken as a whole and interpreted in accordance with the principles of the present invention as taught herein and understood by one of ordinary skill in the art. It will be further understood that for clarity in certain cross-sectional views, certain elements are not shown in cross-section, as doing so would not assist in the understanding of the invention.

FIGS. 1-6 illustrate an embodiment of a hydraulic motor apparatus 110 including a motor housing 120 wherein a motor assembly 122 is coupled to and hydraulically drives an output shaft 125. Motor housing 120 can be mounted on a frame (not shown) by fasteners such as screws 121 shown in FIG. 1. Hydraulic motor apparatus 110 further includes a hydraulically ported end cap 130 and adapter 140 in communication with motor assembly 122. As depicted, motor assembly 122 is a fixed displacement axial piston motor driven by hydraulic fluid supplied by a separate hydraulic pump 116 (shown schematically in FIG. 6). As will be understood by one of skill in the art, hydraulic pump 116 should be a unidirectional pump to avoid back-flushing filter 160. Alternatively, a bidirectional pump (not shown) could be used to supply hydraulic fluid to hydraulic motor apparatus 110 in the event a filter bypass (not shown) is incorporated in adapter 140 or filter 160. Motor assembly 122 includes pistons 124 which are set in motor cylinder block 123 and bear against thrust bearing 126. An optional Hall effect sensor 155 can be included to act as a rotational sensor to detect the speed of rotation of the motor cylinder block 123 by sensing the pistons 124 as they rotate past sensor 155. The speed of rotation of the motor cylinder block 123, and hence that of output shaft 125, is communicated back to a controller 170 in a feedback loop for controlled adjustment of a pressure reducing valve 150, as detailed herein below and illustrated in FIG. 7. Thrust bearing 126 is disposed in an insert 127 that has one or more (two shown) indentations 127a. Indentations 127a interface with mating protrusions 120a of motor housing 120 to prevent rotation of insert 127 and to ensure proper orientation of thrust bearing 126. Indentations 127a can be shaped or sized differently from one another or located such that insert 127 can only be installed in one orientation to prevent an assembly error.

A bushing 128 retains the components of thrust bearing 126 in insert 127. Insert 127 can be placed in a fixture to install the bushing 128. Insert 127 has a fixture contact face 127b that is parallel to a thrust bearing contact face 127c. This allows bushing 128 to be press-fit into insert 127, with pressure applied at a 90 degree angle to face 127c, prior to installation of combined insert 127 and bushing 128 into motor housing 120. Components of thrust bearing 126 can be located inside bushing 128 before the combined insert 127 and bushing 128 are installed in motor housing 120. Alternatively, such components of thrust bearing 126 may be located inside bushing 128 after the combined insert 127 and bushing 128 are installed in motor housing 120. The angle of thrust bearing contact face 127c relative to the axis of rotation of output shaft 125 establishes the displacement angle of motor assembly 122.

Rotation of motor cylinder block 123 drives output shaft 125 that extends through block 123. Output shaft 125 is supported in motor housing 120 by bearings 114 and 115 and extends from an end of motor housing 120 opposite end cap 130. Axial face seal 118 is press fit onto the output shaft 125 to deflect water spray and other contamination away from the shaft seal 113, particularly water from high-pressure washing of vehicles, machines or equipment in which hydraulic motor apparatus 110 is used. The exposed end of output shaft 125 can be fitted with a fan blade assembly (not shown) or coupled to drive a wheel or other drivable mechanism (not shown).

End cap 130 is secured to motor housing 120 by screws 131 and provides flow of hydraulic fluid between motor assembly 122 and adapter 140. End cap 130 and motor housing 120 cooperate to form an internal sump or chamber 112. End cap 130 has a motor inlet port 130a which connects to motor inlet passage 130c to provide hydraulic fluid under pressure to motor assembly 122. After passing through motor assembly 122, hydraulic fluid then flows through motor outlet passage 130d and motor outlet port 130b. In the embodiment depicted, inlet port 130a and outlet port 130b are formed on a surface of end cap 130 generally perpendicular to the running surface 130m on which motor cylinder block 123 is disposed. End cap 130 includes a flushing orifice 130e that allows hydraulic fluid to pass from motor outlet passage 130d into motor chamber 112 to ensure that motor chamber 112 is always sufficiently filled with clean, filtered hydraulic fluid. End cap 130 also includes a case drain passage 130f which communicates with case drain port 130g to allow excess hydraulic fluid to flow from motor chamber 112 to an external reservoir 162, as depicted schematically in FIG. 7. End cap 130 has system port tubes 130h which define portions of motor inlet passage 130c and motor outlet passage 130d and carry fluid from and to adapter 140. Optional system port tubes 130i and 130k (all shown closed % not machined) allow adaptation of the end cap 130 for use with an alternative embodiment (not shown) of adapter 140 or simply as system ports in an application where an adapter is not needed. Adapter 140 can be removed so that motor inlet port 130a and motor outlet port 130b serve as system ports connected in a known manner by hydraulic lines and fittings to a standalone pump, such as hydraulic pump 116. Motor inlet port 130a and motor outlet port 130b are shown threaded to receive fittings in order to illustrate the versatility of hydraulic motor apparatus 110, but threads are not required in these ports to install adapter 140.

Figure 5:
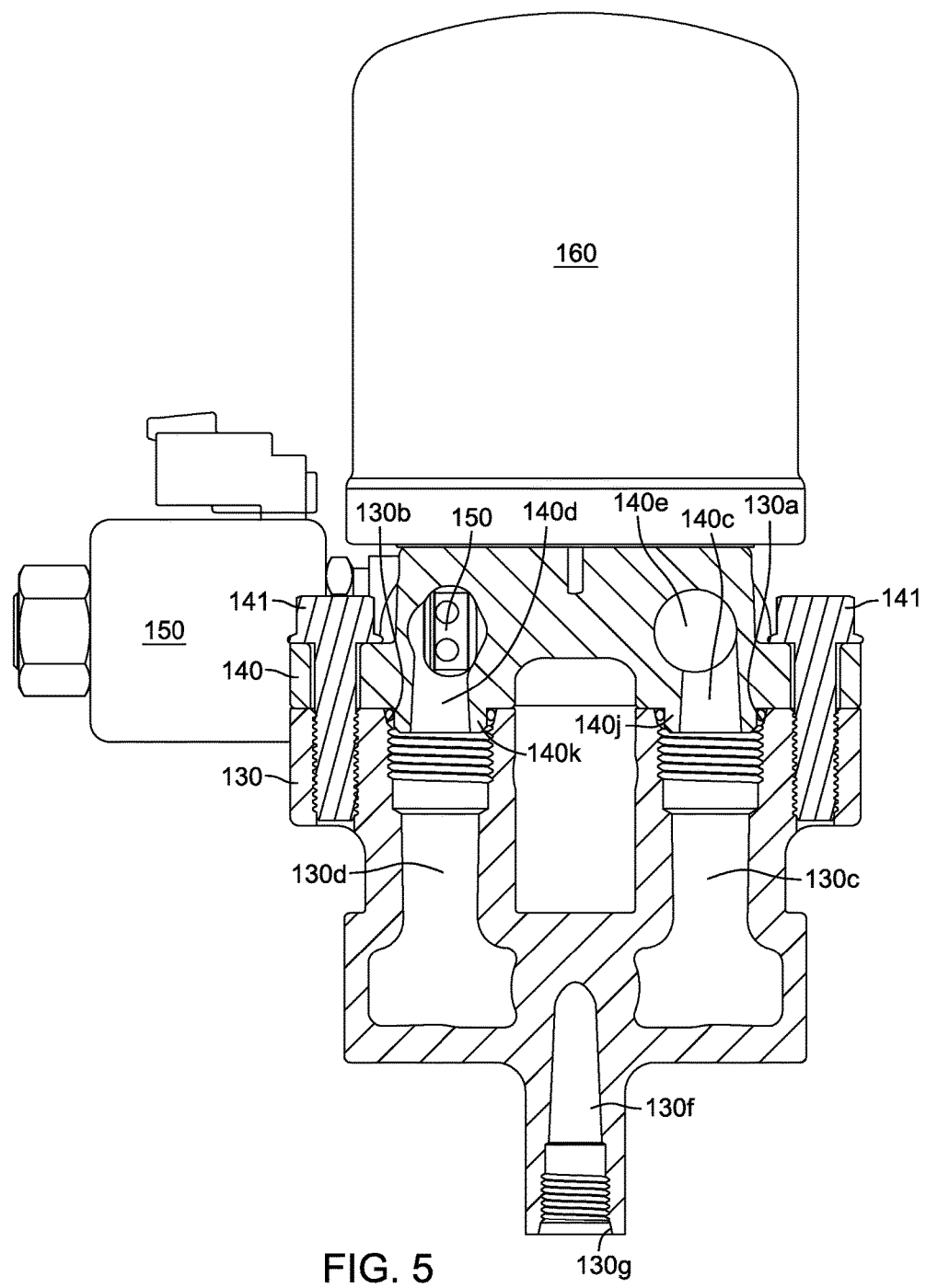
FIG. 5 is a cross-sectional view of the motor apparatus of FIG. 3 along line 5-5 in FIG. 3.

As shown in FIG. 5, adapter 140 is secured to end cap 130 by screws 141 and provides an interface with both the pressure reducing valve (PRV) 150 and the filter 160. Adapter 140 has motor inlet projection 140j positioned within motor inlet port 130a and motor outlet projection 140k positioned within motor outlet port 130b. Thus, adapter inlet passage 140c communicates with motor inlet passage 130c and adapter outlet passage 140d communicates with motor outlet passage 130d to provide a portion of the hydraulic fluid circuit.

Figure 6:
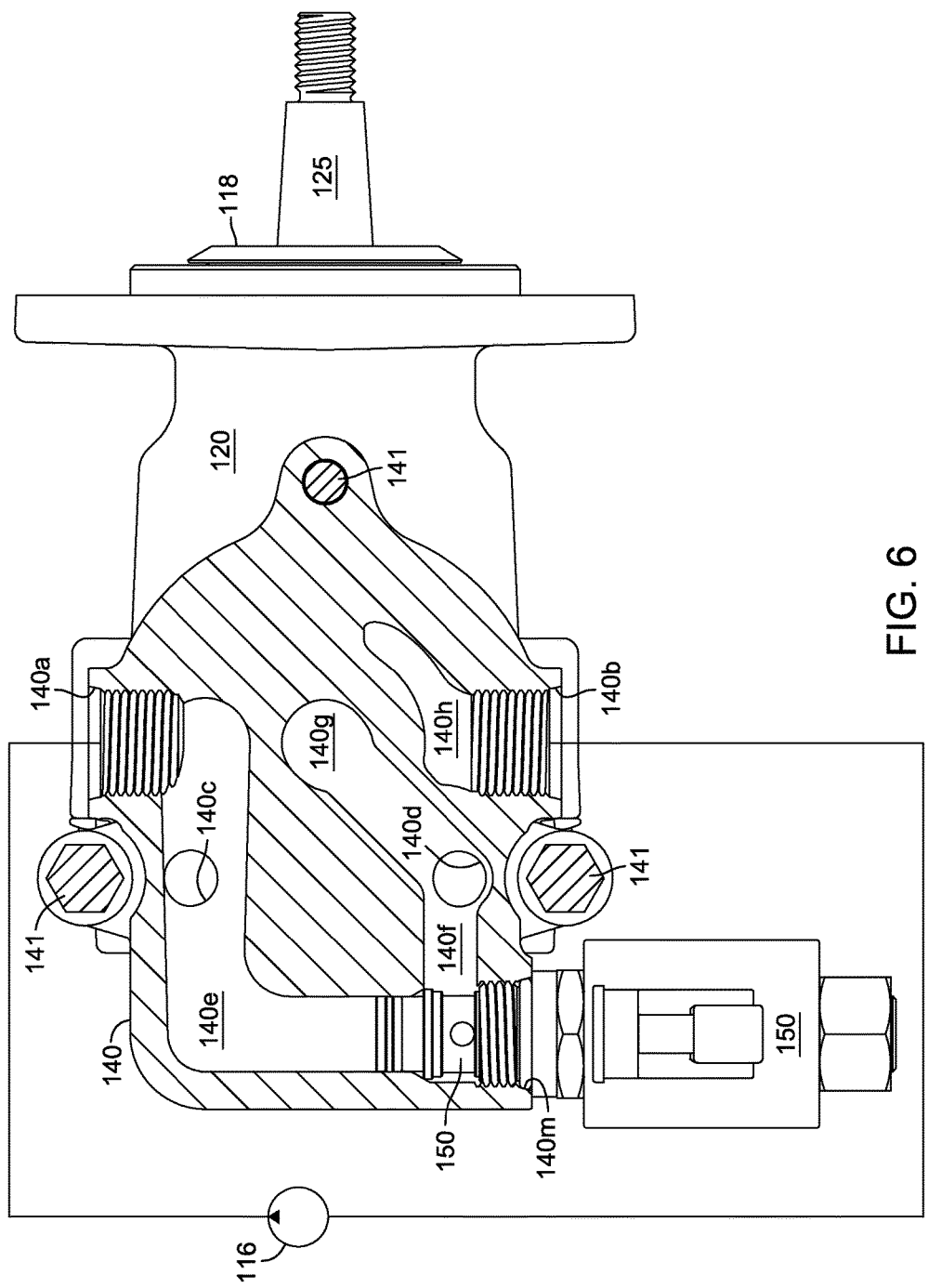
FIG. 6 is a partial schematic, cross-sectional view of the motor apparatus of FIG. 3 along line 6-6 in FIG. 3 in combination with a hydraulic pump.
Figure 7:
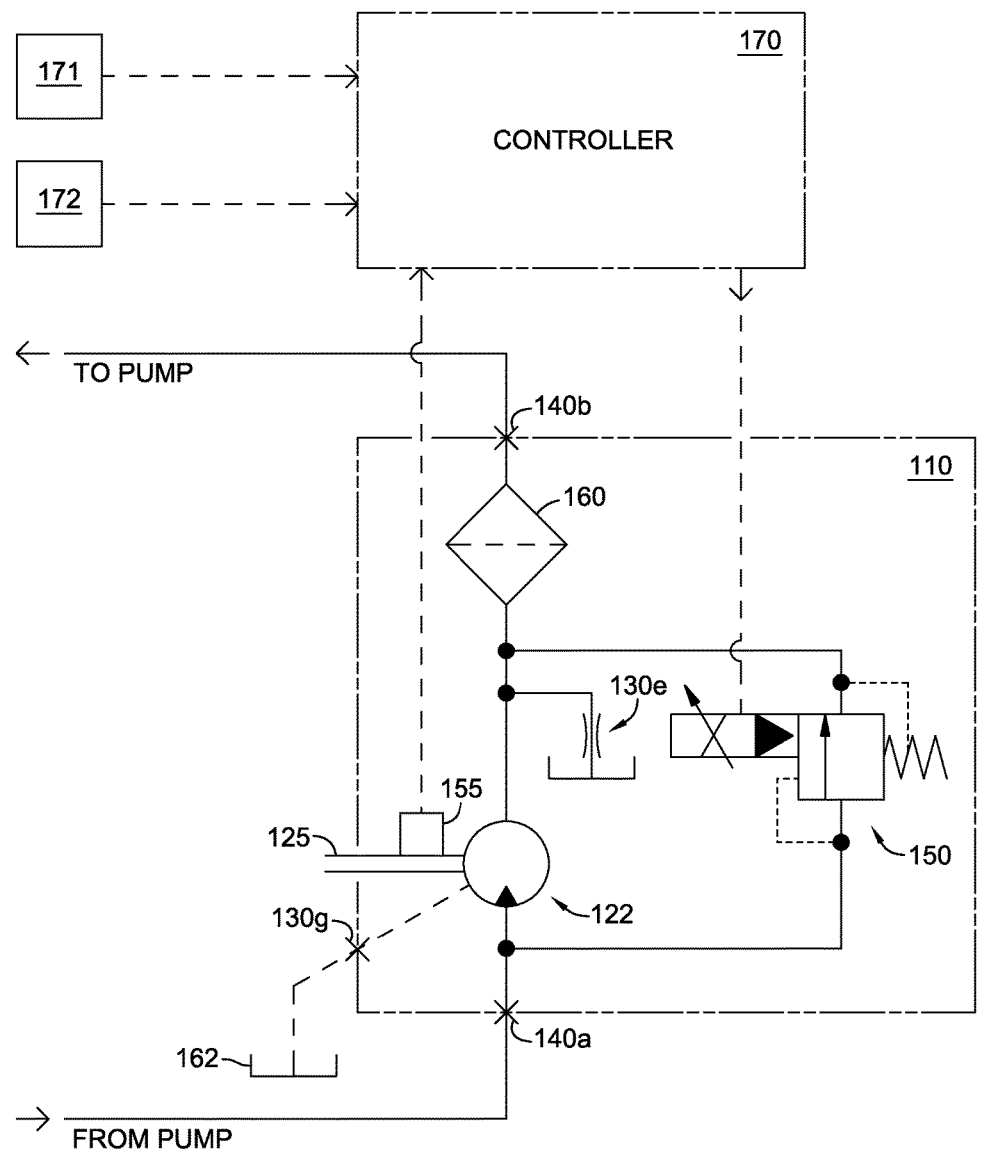
FIG. 7 is a schematic of the motor apparatus of FIG. 1 in combination with other system components.

As shown in FIGS. 6 and 7, hydraulic fluid under pressure enters adapter 140 through system inlet port 140a and passes into PRV inlet passage 140e. PRV 150 is installed in PRV port 140m and is in fluid communication with PRV inlet passage 140e and PRV outlet passage 140f. As depicted, PRV 150 is a normally-closed valve having a pressure relief function at a predetermined upper limit ($P_{max}$) that can also be electrically controlled to allow passage of hydraulic fluid therethrough across a range of pressures below $P_{max}$ in response to command signals from a controller 170 in communication with one or more system sensors 171, 172 measuring system parameters affected by the output of hydraulic motor apparatus 110. PRV 150 can be a screw-in, cartridge-style, pilot-operated, spool-type, electrohydraulic reduction valve that can be infinitely adjusted across a prescribed pressure range using a variable electrical input, such as the model PRV10-POC valve manufactured by Comatrol of Easley, S.C. As current supplied by controller 170 to PRV 150 increases, the pressure at which PRV 150 cracks to allow hydraulic fluid to pass from PRV inlet passage 140e to PRV outlet passage 140f decreases.

The use of PRV 150 establishes a maximum allowable system pressure (Pmax) and sets a limit on the mechanical torque of output shaft 125, thus protecting the components of motor assembly 122 and other hydraulic system components. The ability of controller 170 to adjust the pressure at which PRV 150 cracks permits variable output from hydraulic motor apparatus 110 in response to system parameters being monitored by controller 170. When the hydraulic fluid pressure in PRV inlet passage 140e is below the set pressure limit all of the hydraulic fluid under pressure entering through system inlet port 140a passes through adapter inlet passage 140c and flows through end cap 130 to motor assembly 122. Fluid at lower pressure then flows back from motor assembly 122 through end cap 130 and into adapter outlet passage 140d and from there into filter inlet passage 140g. After passing through filter 160, the hydraulic fluid passes through filter outlet passage 140h and out through system outlet port 140b. When the hydraulic fluid pressure in PRV inlet passage 140e is above the set pressure limit, a portion of the hydraulic fluid entering through system inlet port 140a flows from PRV inlet passage 140e into PRV outlet passage 140f through PRV 150, thus bypassing motor assembly 122. The bypass of that portion of the hydraulic fluid will be sufficient to reduce the hydraulic fluid pressure in PRV inlet passage 140e and also adapter inlet passage 140c to the set limit. It will be appreciated by one skilled in the art that limiting the hydraulic fluid pressure to motor assembly 122 will limit the mechanical torque of the output shaft 125.

By way of example only, if hydraulic motor apparatus 110 is applied as a fan drive motor, wherein output shaft 125 is coupled to a fan (not shown) to cool the oil or coolant of an internal combustion engine (not shown), the measured system parameters registered by the one or more system sensors 171, 172 could be oil and/or coolant temperature. Fan speed, as measured by optional Hall effect sensor 155, and the resultant volume of air pulled across the fins of a radiator (not shown) affect these system parameters. Controller 170 modulates fan speed to affect change in these system parameters by opening and closing PRV 150 as previously described. Feedback from sensor 155 provides a more granular control. In a closed position, the entire flow of hydraulic fluid received from a pump, such as pump 116, through motor assembly 122 is uninterrupted and fan speed is maximized. When the system sensors 171, 172 indicate that oil and/or coolant temperatures are within predetermined control limits, controller 170 will open PRV 150, permitting a portion of hydraulic fluid to bypass motor assembly 122, reducing its output and consequently fan speed and system loads.

While one or more specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A hydraulic motor apparatus hydraulically connected to a hydraulic pump, the hydraulic motor apparatus comprising:
   a motor housing engaged to an end cap to form an internal sump, the end cap comprising a running surface connected to a first porting system formed in the end cap, an inlet port and an outlet port, wherein the inlet port and the outlet port are formed on a second surface generally perpendicular to the running surface;
   a rotatable cylinder block disposed on the running surface and located in the internal sump, whereby the rotatable cylinder block is hydraulically connected to the first porting system, and an output shaft providing an output of the hydraulic motor apparatus;
   an adapter removably connected to the second surface of the end cap and having a second porting system disposed therein, the second porting system being in fluid communication with the first porting system;
   a filter directly connected to the adapter and connected to the second porting system; and
   a pressure reducing valve disposed in the adapter and connected to the second porting system.

2. The hydraulic motor apparatus of claim 1, wherein the second porting system comprises:
   a first system port and a second system port, both connected to the hydraulic pump;
   an inlet passage connected to the inlet port of the end cap, and to the first system port through a valve inlet passage;
   an outlet passage connected to the outlet port of the end cap;
   a filter inlet passage connected to the outlet passage and a filter outlet passage connected to the second system port; and
   a valve port formed on an external surface of the adapter and in fluid communication with the valve inlet passage and a valve outlet passage, wherein the valve inlet passage is also in fluid communication with the first system port and the inlet passage, and the valve outlet passage is also in fluid communication with the outlet passage.

3. The hydraulic motor apparatus of claim 2, wherein the filter is connected to the filter inlet passage and the filter outlet passage; and the pressure reducing valve is connected to the valve inlet passage and the valve outlet passage.

4. The hydraulic motor apparatus of claim 3, wherein the adapter further comprises a motor inlet projection positioned within the inlet port of the end cap and a motor outlet projection positioned within the outlet port of the end cap.

5. The hydraulic motor apparatus of claim 1, further comprising a rotation sensor disposed in the motor housing to measure the rotational speed of the rotatable cylinder block.

6. The hydraulic motor apparatus of claim 1, further comprising a controller operatively connected to the pressure reducing valve and at least one system sensor measuring at least one parameter affected by the output of the hydraulic motor apparatus, whereby the pressure reducing valve is operatively controlled by the controller in response to input from the at least one system sensor.

7. The hydraulic motor apparatus of claim 5, wherein the rotation sensor is a Hall Effect sensor.

8. The hydraulic motor apparatus of claim 5, further comprising a controller operatively connected to the rotation sensor and to the pressure reducing valve, and at least one system sensor connected to the controller, wherein the at least one system sensor measures at least one parameter affected by the output of the hydraulic motor apparatus to provide feedback to the controller.

9. A hydraulic motor apparatus hydraulically connected to a hydraulic pump, the hydraulic motor apparatus comprising:
   a motor housing engaged to an end cap to form an internal sump, the end cap comprising a running surface connected to a first porting system formed in the end cap, an inlet port and an outlet port, wherein the inlet port and the outlet port are formed on a second surface generally perpendicular to the running surface;
   a rotatable cylinder block disposed on the running surface and located in the internal sump, whereby the rotatable cylinder block is hydraulically connected to the first porting system, and an output shaft providing an output of the hydraulic motor apparatus;
   an adapter connected to the second surface of the end cap and having a second porting system disposed therein, the second porting system being in fluid communication with the first porting system;
   a filter engaged to the adapter and connected to the second porting system;
   a pressure reducing valve disposed in the adapter and connected to the second porting system; and
   a rotation sensor disposed in the motor housing to measure the rotational speed of the rotatable cylinder block.

10. The hydraulic motor apparatus of claim 9, wherein the rotation sensor is a Hall Effect sensor.

11. The hydraulic motor apparatus of claim 9, further comprising a controller operatively connected to the rotation sensor and to the pressure reducing valve, and at least one system sensor connected to the controller, wherein the at least one system sensor measures at least one parameter affected by the output of the hydraulic motor apparatus to provide feedback to the controller.

12. The hydraulic motor apparatus of claim 9, wherein the second porting system comprises:
   a first system port and a second system port, both connected to the hydraulic pump;
   an inlet passage connected to the inlet port of the end cap, and to the first system port through a valve inlet passage;
   an outlet passage connected to the outlet port of the end cap;
   a filter inlet passage connected to the outlet passage and a filter outlet passage connected to the second system port; and
   a valve port formed on an external surface of the adapter and in fluid communication with the valve inlet passage and a valve outlet passage, wherein the valve inlet passage is also in fluid communication with the first system port and the inlet passage, and the valve outlet passage is also in fluid communication with the outlet passage.

13. The hydraulic motor apparatus of claim 12, wherein the filter is connected to the filter inlet passage and the filter outlet passage; and the pressure reducing valve is connected to the valve inlet passage and the valve outlet passage.

14. The hydraulic motor apparatus of claim 13, wherein the adapter further comprises a motor inlet projection positioned within the inlet port of the end cap and a motor outlet projection positioned within the outlet port of the end cap.

15. A hydraulic motor apparatus hydraulically connected to a hydraulic pump, the hydraulic motor apparatus comprising:

a motor housing engaged to an end cap to form an internal sump, the end cap comprising a running surface connected to a first porting system formed in the end cap, an inlet port and an outlet port, wherein the inlet port and the outlet port are formed on a second surface generally perpendicular to the running surface;

a rotatable cylinder block disposed on the running surface and located in the internal sump, whereby the rotatable cylinder block is hydraulically connected to the first porting system, and an output shaft providing an output of the hydraulic motor apparatus;

an adapter connected to the second surface of the end cap and having a second porting system disposed therein, the second porting system being in fluid communication with the first porting system;

a filter engaged to the adapter and connected to the second porting system;

a pressure reducing valve disposed in the adapter and connected to the second porting system; and a controller operatively connected to the pressure reducing valve and at least one system sensor measuring at least one parameter affected by the output of the hydraulic motor apparatus, whereby the pressure reducing valve is operatively controlled by the controller in response to input from the at least one system sensor.

* * * * *

UNITED STATES PATENT AND TRADEMARK OFFICE
CERTIFICATE OF CORRECTION

PATENT NO. : 10,125,752 B1
APPLICATION NO. : 13/946778
DATED : November 13, 2018
INVENTOR(S) : Nathan W. Bonny Page 1 of 1

It is certified that error appears in the above-identified patent and that said Letters Patent is hereby corrected as shown below:

In the Specification

Column 3, Line 37, "shown closed % not machined" should be changed to --shown closed/not machined--.
Column 4, Line 22, "limit all of" should be changed to --limit, all of--.

Signed and Sealed this
Nineteenth Day of February, 2019

Andrei Iancu
*Director of the United States Patent and Trademark Office*